Sept. 26, 1967  B. GUIGNARD  3,343,210
MEANS FOR THE MANUFACTURE OF PLASTIC CONTAINERS
Filed Oct. 15, 1963  6 Sheets-Sheet 1

INVENTOR.
BORIS GUIGNARD
BY Harold P. Beck
ATTORNEY

Sept. 26, 1967  B. GUIGNARD  3,343,210
MEANS FOR THE MANUFACTURE OF PLASTIC CONTAINERS
Filed Oct. 15, 1963  6 Sheets-Sheet 2

INVENTOR.
BORIS GUIGNARD
BY Harold J. Beck
ATTORNEY

Sept. 26, 1967   B. GUIGNARD   3,343,210
MEANS FOR THE MANUFACTURE OF PLASTIC CONTAINERS
Filed Oct. 15, 1963   6 Sheets-Sheet 4
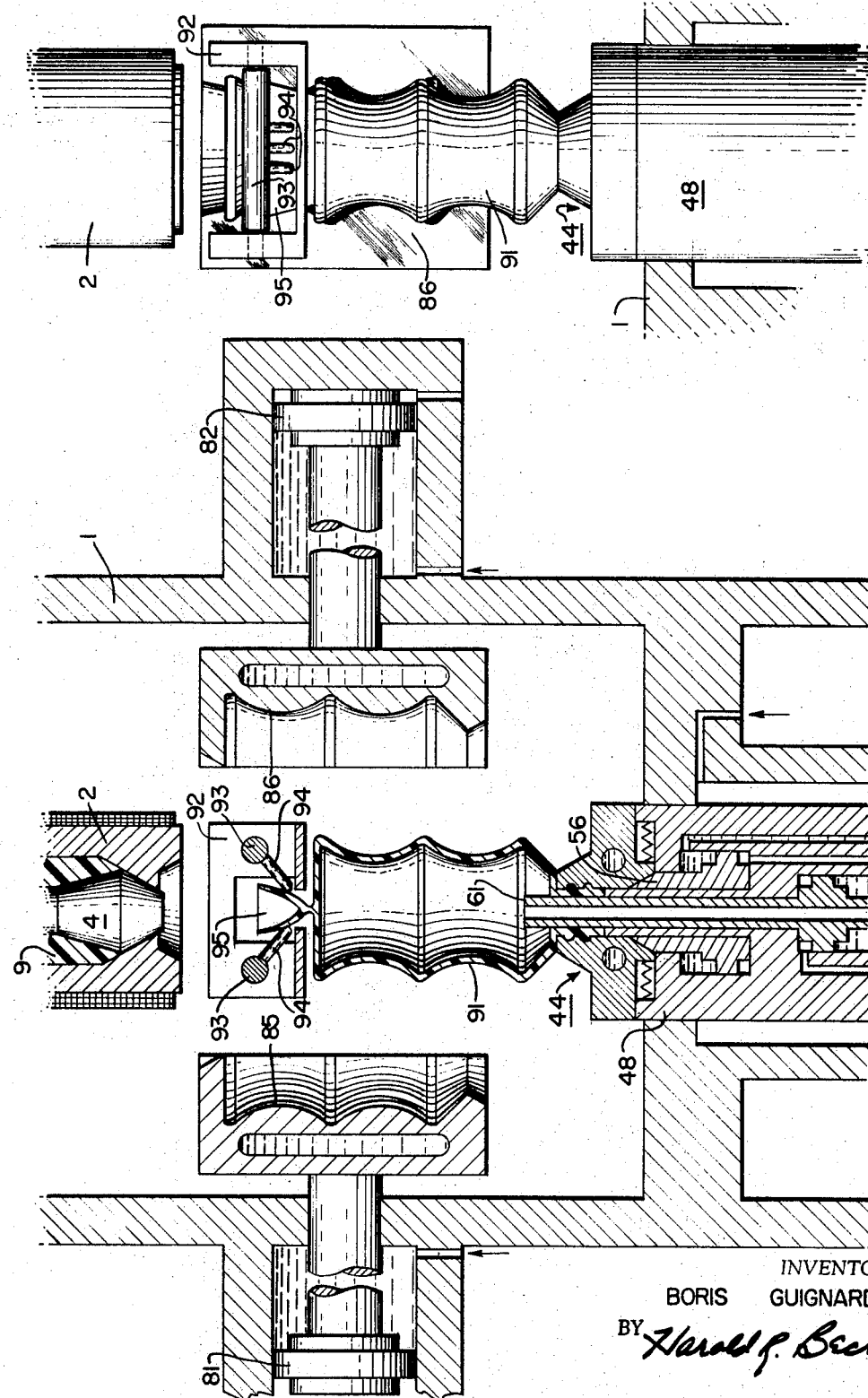
INVENTOR.
BORIS GUIGNARD
BY Harold P. Beck
ATTORNEY

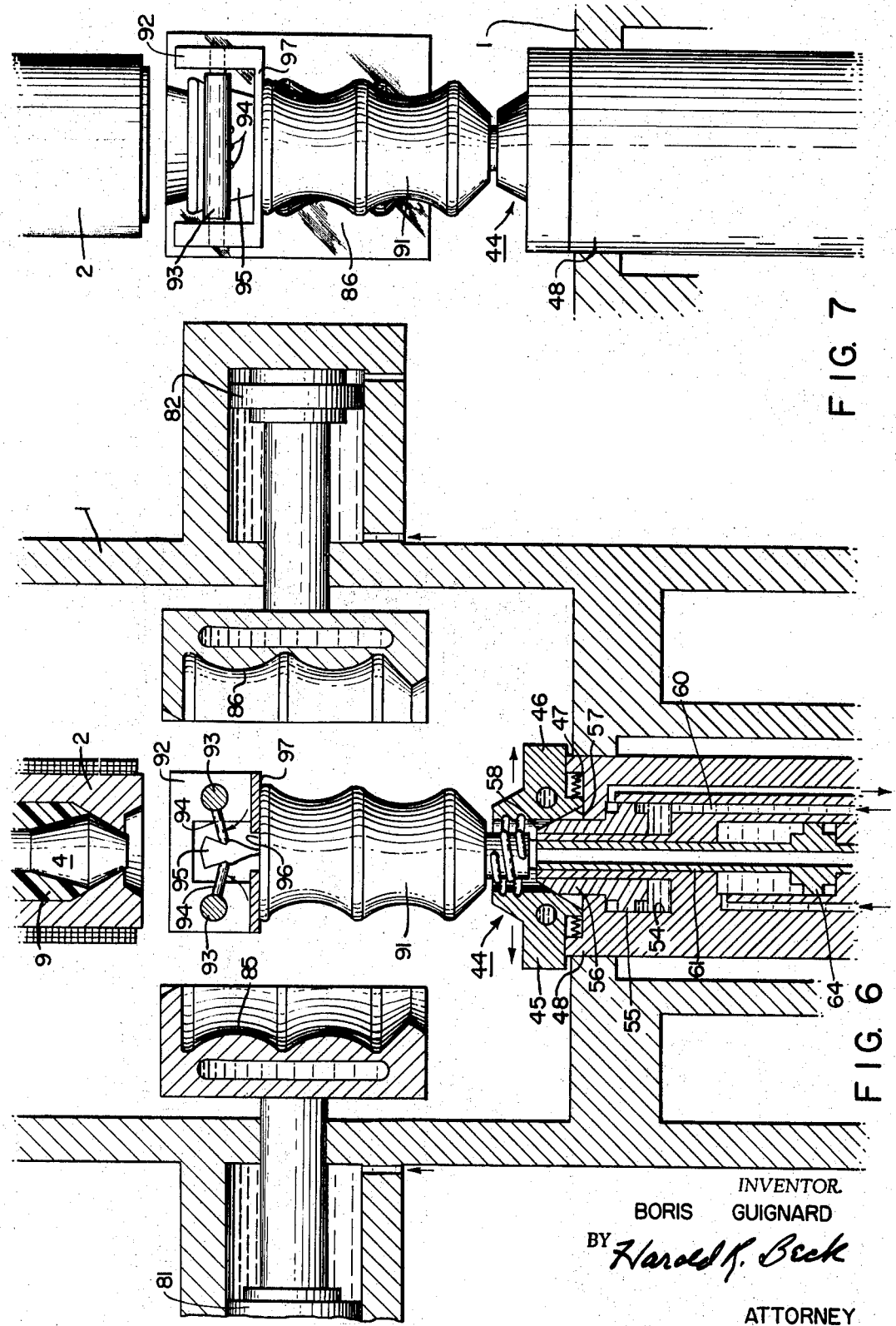

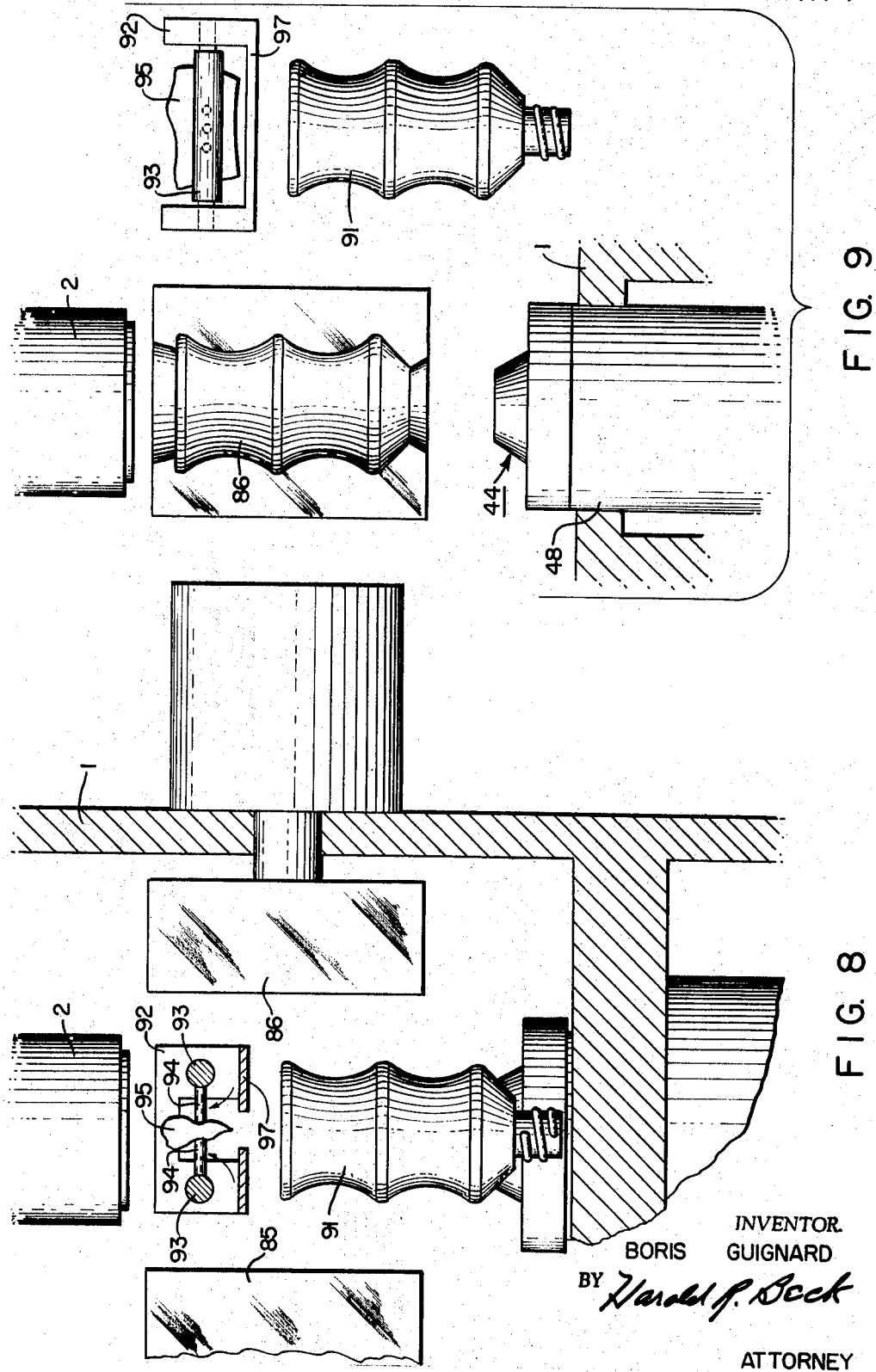

United States Patent Office 3,343,210
Patented Sept. 26, 1967

3,343,210
MEANS FOR THE MANUFACTURE OF PLASTIC CONTAINERS
Boris Guignard, Lucens, Switzerland, assignor to Rexall Drug and Chemical Company, Los Angeles, Calif., a corporation of Delaware
Filed Oct. 15, 1963, Ser. No. 316,364
11 Claims. (Cl. 18—5)

The present invention is directed to apparatus for the manufacture of containers of plastic material, such as bottles, by the blow molding technique.

In the known blow molding procedures, the parison is extruded and it is desirable to vary the wall thickness of the formed parison so that the wall of the container, obtained by blowing air into the parison, has a desired thickness in predetermined areas. Portions of the blown container are subjected to greater stresses in use than other portions of the container; therefore it is desirable to reinforce the first portions of the container by providing a thicker wall in these portions.

In the known procedures, the parison wall thickness is varied by adjusting the axial position of a mandrel positioned within the extrusion die of the distributor of plastic material. The plastic parison is extruded from a variable annular distribution orifice formed between the die and mandrel. Axial movement of the mandrel relative to the die produces variations in the wall thickness of the formed parison. The axial position of the mandrel is controlled in synchronism with the plastic feed source for the extruder, for example, by means of a programming mechanism controlling all the movable members. These known devices do not operate in a satisfactory amnner to insure the proper desired distribution of plastic in the parison and the placement of the parison in the mold with the plastic distribution in the desired areas of the mold. If, for example, the mandrel of the extruder is actuated a half second too soon or too late, too much or too little plastic material will be extruded in the desired areas, sc that the wall of the resulting container will not have the desired thickness or thicknesses at the necessary stress points. When this time advance or delay occurs in the control of the mandrel, this process of adjustment of the annular distribution orifice constitutes a disadvantage rather than an advantage.

The apparatus according to the present invention includes means for the injection of fluid plastic into a cavity to form a head portion of a container prior to extrusion of the parison. A die, forming part of the cavity, is momentarily held against the extrusion orifice during filling of the cavity; and the die then moves away from the orifice during the extrusion of the parison while controlling the flow of plastic from the extrusion orifice as a function of the axial position of the movable die relative to the orifice. This results in a precise control of the plastic distribution in the parison relative to the mold cavity in which the parison is blown.

The control of plastic flow from the extrusion orifice as a function of the axial position of the die may be effected by mechanical, hydraulic or electric control.

The machine according to the present invention includes at least one extrusion head for plastic material, a mold of at least two shells, and means for blowing air into an extruded parison after the mold has been closed around the parison. The extrusion head includes a mandrel, for adjusting the plastic flow, adapted to be moved axially to vary the section width of the extrusion orifice in the extrusion head. The machine further includes a head die for the injection molding of a head portion of the container, means for moving the container head die during the extrusion of the parison, and means for controlling the position of the mandrel in response to the spacing of the head die relative to the extrusion orifice.

As a modification, this invention provides an apparatus for filling the formed container with the product which it is designed to enclose. The filling operation may take place while the newly formed container is still hot; so that the product will be sterilized and the container cooling will be accelerated.

The machine also includes the use of several extrusion heads cooperating with multiple head dies actuated hydraulically by a common piston. A cam track is integral with the piston and cooperates operatively with a follower to control plastic flow from the extrusion heads by controlling the adjustable mandrels in the respective heads. This machine permits the simultaneous formation of a plurality of containers with a corresponding increase in production rate.

This invention may be more clearly understood by reference to the accompanying drawings which show, by way of example and diagrammatically, the preferred embodiment of the machine of the present invention.

FIGURE 4 is a partial view similar to the preceding figures, showing the machine during the withdrawal of the container from the mold;

FIGURE 5 is a side view of the machine of FIGURE 4;

FIGURE 6 is a view similar to FIGURE 4, showing the initial operational step for removing the container from the mold;

FIGURE 7 is a side view of the machine of FIGURE 6;

FIGURE 8 is a view similar to FIGURE 6, showing a subsequent operational step for removing the plastic tail from the container and releasing the finished container;

FIGURE 9 is a side view of the machine of FIGURE 8;

The machine of the invention comprises in general the combination of an Extrusion Head Assembly (A) cooperating with a Head Forming Die Assembly (B) in timed relation with the action of Mandrel Control Assembly (C). The action of these assemblies is coordinated with a Mold Assembly (D) and other functioning parts as will hereinafter be described.

Extrusion head assembly

Figure 1:
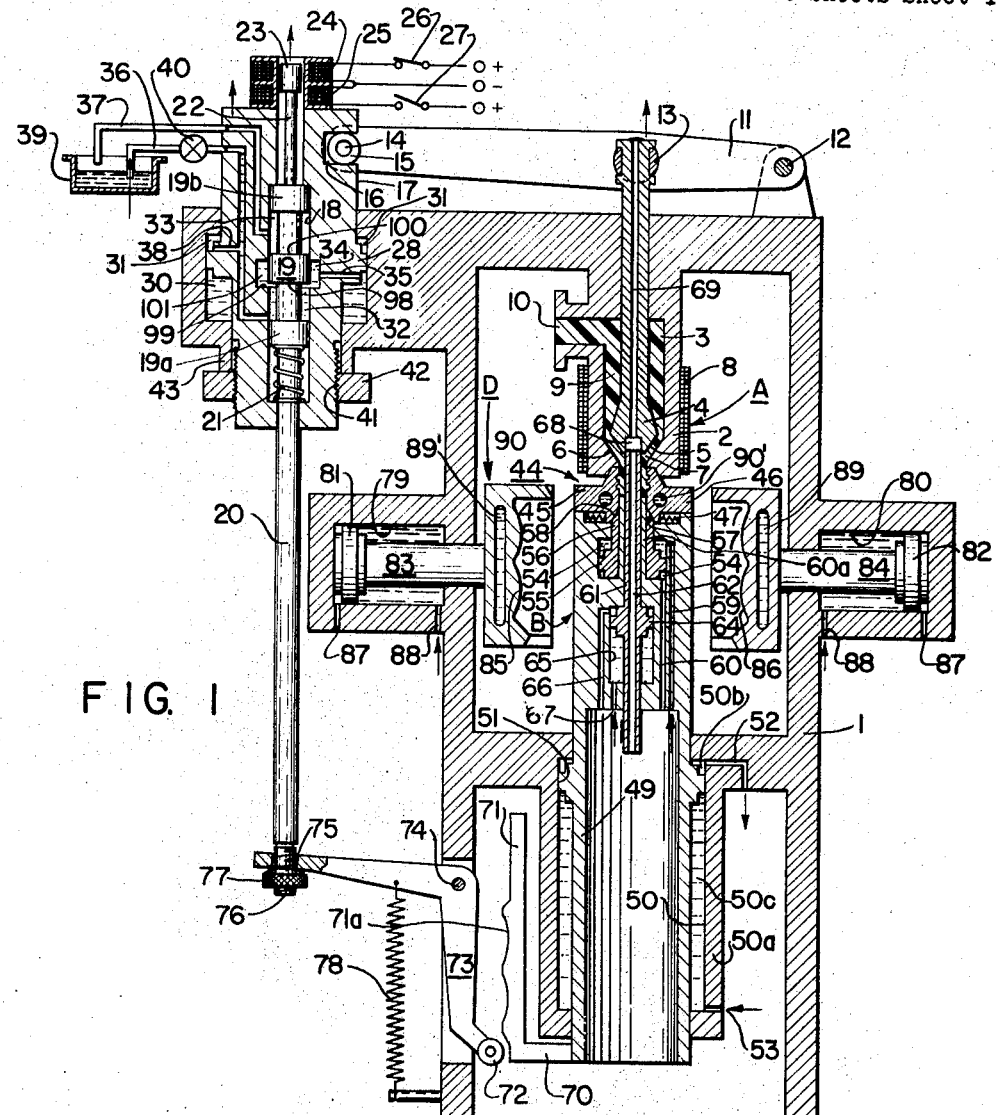
FIGURE 1 is a diagram showing, in section and in elevation, the essential members of the machine according to the invention during the injection molding of the head of a container.

Referring to FIGURE 1 a frame 1 supports, in its upper portion, an extrusion head 2 provided with an axial bore 3 in which a mandrel 4 moves axially for adjustment of flow of plastic from the extrusion head. Adjustable mandrel 4 is guided axially in a conventional manner in the bore 3. The lower end surface 5 of mandrel 4 is of general truncated conical shape and is designed to cooperate with a corresponding truncated conical surface 6 which forms the lower end of bore 3 in the head 2. Surfaces 5 and 6 define in the open space between the surfaces, with the member 4 spaced from the bore 3, a frustro conical passage 7.

A heating member 8 surrounds the head 2 and is provided with an electrical power source.

Bore 3 forms a chamber 9 which is fed with fluid thermoplastic material (i.e., polyethylene, polypropylene, etc.) under pressure through a conduit 10 connected to a conventional plastic extruder, not shown. The chamber 9 leads to the passage 7 between the two frustro conical surfaces 5 and 6. The passage 7 is of adjustable width to permit varying the plastic flow from head 2 through the passage.

The control of the axial movements of the adjusting mandrel 4 is effected through a lever 11 pivoted at 12 on frame 1. Mandrel 4 is vertically slidable in frame 1 and pivoted at 13 on lever 11. The end 14 of lever 11 carries a roller 15 rotatably engaged in a slide slot 16 on a block 17 which encloses means for the control of the movements of the adjusting mandrel 4.

Mandrel control assembly

Block 17 is provided with bore 18 which slidably receives a valve 19. A downwardly extending rod 20 is integral with the underside of valve 19. Valve 19 is biased upwardly by a spring 21 captive within block 17 between the lower end thereof and valve guide 19a integral with rod 20 and slidable in bore 18.

Rod 20 extends above valve 19 and is integral with the underside of a second valve guide 19b slidably mounted in bore 18. A rod 22 extends upwardly from and is integral with the top surface of valve guide 20b. The upper end of rod 22 has a magnetic core 23—the position of which is determined by two electromagnets 24 and 25 mounted on the top of block 17. The electrical circuits of the electromagnets are controlled by switches 26 and 27.

The outer wall of block 17 has a continuous peripheral piston ring or rib 28 slidably received within a cylinder 29 integral with frame 1. Thus, the block 17 is a reciprocating piston within cylinder 29. The lower surface 30 of the rib 28 is of larger area than the upper surface 31.

The bore 18 includes an upper circular chamber 33, a lower circular chamber 32 and a middle circular chamber 34 which joins and is larger than chambers 32 and 33. Chamber 34 communicates with a conduit 35 which passes through block 17 and opens below the lower surface 30 of the piston ring 28.

Block 17 is provided with two conduits 36 and 37. The conduit 36 extends from a reservoir 39 into the lower chamber 32 of bore 18, below chamber 34. A conduit 38 is joined at one end with conduit 36 and opens at its other end above the upper surface 31 of the piston ring 28. Conduit 36 is fed with oil under pressure from reservoir 39 by pump 40.

Conduit 37 extends through block 17 and opens at its one end into upper chamber 33, above chamber 34, and opens at its other end into reservoir 39 to return oil to the reservoir.

The lower end of block 17 is threaded at 41 and threadably receives a nut 42 which functions as an adjustable stop to limit the upward movement of block 17, relative to frame 1, by abutting against portion 43 of frame 1 of the machine. Thus through block 17 and valve 19, with their related parts, the position of mandrel 4 is adjusted with respect to conical surface 6 to vary the flow of plastic from extrusion head 2.

As will be described hereinafter, valve 19 of this control assembly C is responsive to the position of a die 44 during the formation of the container head and the extrusion of the parison.

Head forming die assembly

A head die 44 is formed by two movable segments 45 and 46 normally biased together by the action of springs 47 recessed in a cylindrical block 48. The segments provide a cavity in which the head of the container is formed and are movable outwardly from the position of FIGURE 1 to the position of FIGURE 6.

The lower end 49 of block 48 has an integral outwardly extending piston ring on rib 51 slidably engaged with the inside surface 50 of a cylinder 50a affixed to machine frame 1. Thus the lower end 49 operates as a reciprocating piston in cylinder 50a.

Pressurized fluid is supplied through conduit 52 to the upper end 50b of the cylinder to move the block end 49 downward, and pressurized fluid is supplied through conduit 53 to the lower end 50c of the cylinder to move the block end 49 upward. The pressurized fluid is supplied and controlled in a conventional manner. The vertical reciprocation of block end 49 also reciprocates the entire block 48 and its component parts hereinbefore and hereinafter described.

Block 48 is provided with a cylindrical chamber 54, in its upper end, in which is mounted a vertically reciprocating piston 55. A tubular member 56 is integral with the top face of piston 55 and has a conical end portion 57 engageable against a complimentary truncated conical surface 58 in the lower face of segments 45 and 46. Upon upward movement of the tubular member 55, the segments 45 and 46 are cammed apart against the springs 47. The piston 55 is moved vertically by pressurized fluid, acting against one or the other of its faces, introduced into cylinder chamber 54 through conduits 59 or 60 supplied and controlled by conventional means (not shown).

A tubular sleeve 60a is integral with and extends upwardly from the lower face of the surface forming chamber 54. Sleeve 60a passes upwardly through and is slidably received within piston 55 and member 56. The upper end of sleeve 60a extends above conical end portion 57 on member 56 and is received between die segments 45 and 46 (in closed position as shown in FIGURE 1) to provide the lower surface of the mold cavity in which the container head is molded.

A tube 61, having a central air conduit 62, is slidably mounted in sleeve 60a and coaxially with member 56, die 44 and sleeve 60a.

The lower end of tube 61 is integral with a piston 64 reciprocal vertically in a cylinder 65 in the middle block 48. Piston 64 is vertically actuated by pressurized fluid introduced into the upper or lower end of cylinder 65 by conduits 66 or 67, respectively, which are supplied and controlled by conventional means, not shown.

Adjustable mandrel 4 has, in its lower end, an opening 68 which slidably receives the upper end of tube 61. A passage 69, extending vertically through mandrel 4, vents opening 68 with the atmosphere.

The lower end 49 of block 48 has an integral, outwardly extending bracket 70 which supports an upstanding cam track 71. The outer surface 71a of the cam track has a contoured configuration for the purpose to be described hereinafter.

A cam follower 72 is rotatably mounted on one end of a lever 73 pivoted at 74 to the machine frame 1. The lever 73 is L-shaped with its pivot point 74 at the point of juncture of the legs of the L. One leg of the lever extends substantially horizontal and the other leg substantially vertical. An opening 75 is provided in the outer end of the horizontal lever leg and receives the end 76 of rod 20 attached to valve 19. End 76 is threaded and threadably mounts knurled nut 77 thereon. A spring 78 urges lever 73 in a counterclockwise direction (as viewed in FIGURE 1) to bias follower 72 against surface 71a of cam track 71.

The function and movements of the Mandrel Control Assembly (C) is responsive to the position of cylinder 49, through the linkage provided by lever 73 and rod 20.

Molding assembly

Frame 1 of the machine supports two cylinders 79 and 80 housing reciprocating pistons 81 and 82 respectively, connected by rods 83 and 84 to mold shells 85 and 86, respectively, of the container mold. The two pistons 81 and 82 are actuated by pressurized fluid introduced into the ends of the cylinders 79 and 80 through conduits 87 and 88 supplied and controlled by conventional means, not shown.

Chamber 89 and 89' in the mold shells 86 and 85 respectively, as well as chambers 90 and 90' in the segments 45 and 46, respectively, in the die head, are supplied with a circulating cooling liquid, such as cold water.

*Container removing and de-tailing means*

The machine includes means for gripping the formed container 91 (see FIGURES 4 to 9) including a movable support 92 on which are pivotally mounted two spindles 93 connected to pivot about horizontal axes. The spindles pivot toward and away from each other as viewed in FIGURE 4. Each spindle carries a group of downwardly directed fingers 94. The support 92 is movable fore and aft under the head 2 by a hydraulic piston and cylinder 92a mounted on machine frame 1. Piston rod 92b extends from piston 92a and its outer end is affixed to support 92.

After the opening of the mold 85 and 86 to expose the newly formed container 91, the support 92 is moved by cylinder 92a to a position over the container as shown in FIGURE 4, fingers 94 grip the plastic tail 95 remaining on the bottom surface of container 91 and support the container during opening of head die 44 (see FIGURE 6). The first movement of rotation of spindles 93 causes them to engage the fingers 94 on both sides of tail 95 to grip the latter, the bottom of the container bearing against the lower surface 97 of support 92.

Figure 10:
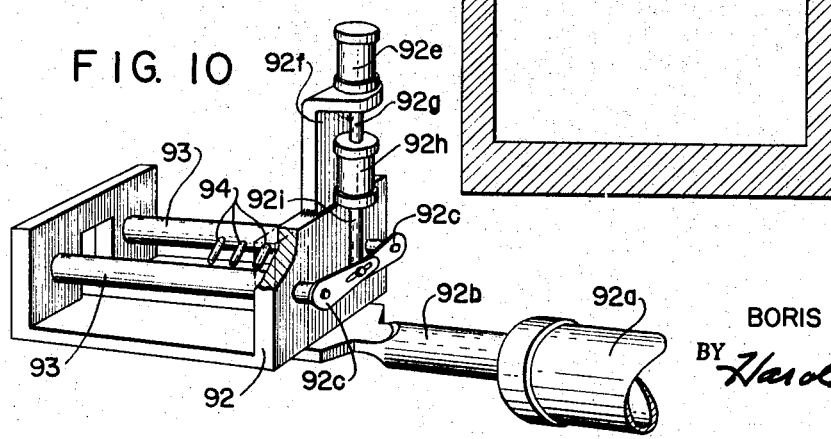
FIGURE 10 is a perspective view of a container removing and de-tailing mechanism.
Figures 2, 11:
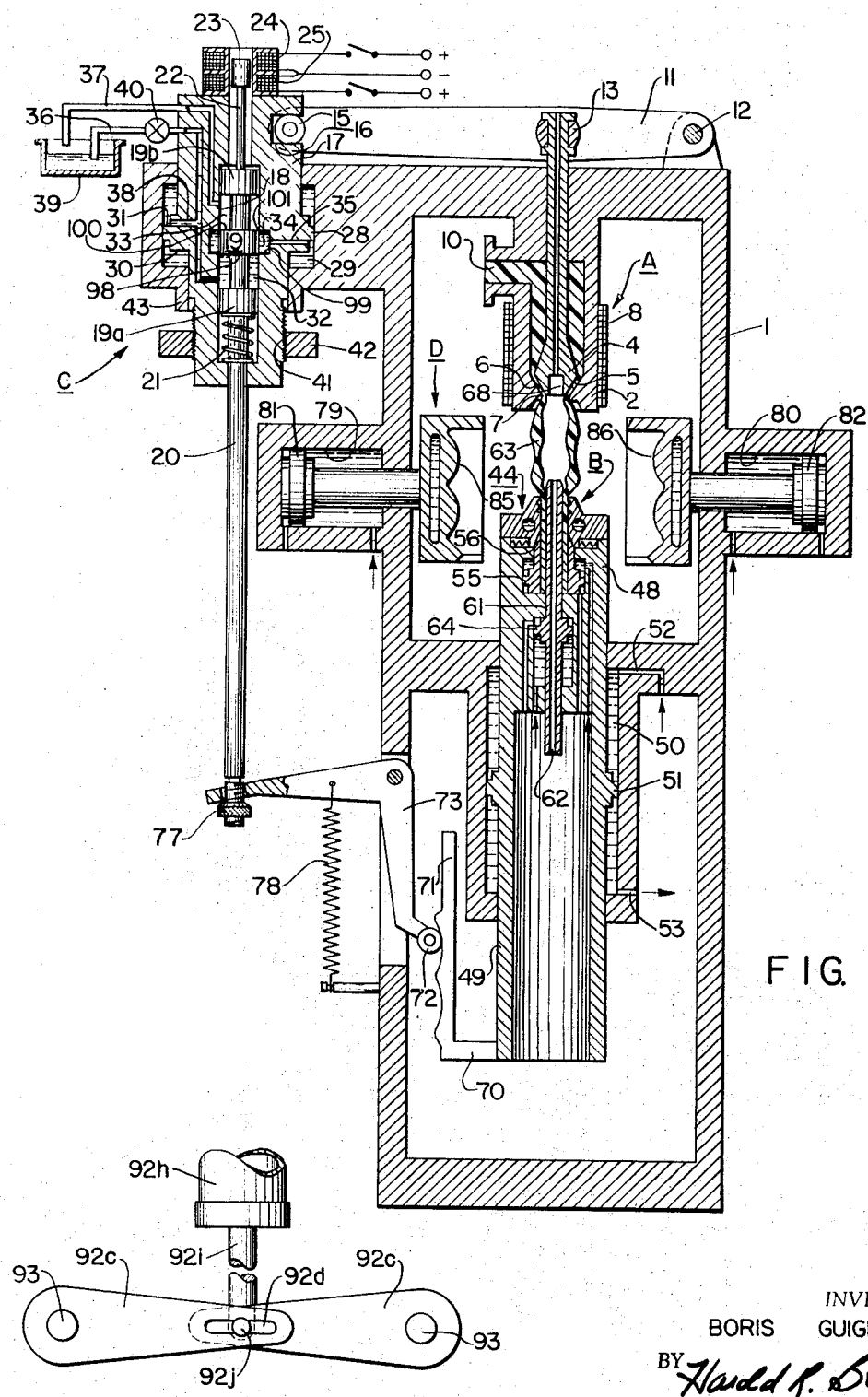
FIGURE 2 is a view similar to FIGURE 1, showing the machine during extrusion of the parison from which the container is formed.
FIGURE 11 is an end elevation view, taken from the right hand end of FIGURE 10, of a portion of the de-tailing mechanism.

Referring to FIGURES 10 and 11, the spindles 93 are rotatably mounted in spaced, parallel relationship to each other, in the end plates of support 92. One end of each spindle extends beyond the end plate of the support and has an integral arm 92c. The arms extend inwardly to an overlapping relationship as shown in FIGURE 11. The inner end of each arm 92 has a slot 92d extending radially outward from the spindle 93 to which the arm is affixed.

A piston and cylinder 92e is mounted on a bracket 92f affixed to support 92. A piston rod 92g extending from piston and cylinder 92e is affixed, at its lower end, to a second cylinder 92h which contains a reciprocating piston and depending piston rod 92i. The lower end of piston rod 92i has an integral follower pin 92j which is slidably received within the overlapping slots 92d on arms 92c.

The cylinders and pistons 92e and 92h are individually actuable to provide a two step swinging movement to arms 92c and rotational movement to spindles 93 for the purpose to be described hereinafter.

Suitable supplies of pressurized fluid and flow controls therefor are provided for piston and cylinders 92a, 92e and 92h.

The rotation of spindles 93 toward each other to grip the tail 95 is effected by activation of cylinder 92h to move piston rod 92i upward, as viewed in FIGURE 10. FIGURE 6 illustrates the gripping of the tail 95.

The container head is then released by an outward movement of segments 45 and 46. The container is then held only by the tail 95 and the cylinder 92a is activated to move support 92 to a retracted position from beneath head 2 (see FIGURES 8 and 9). Cylinder 92e is then activated to rotate the arms 92c upwardly, as viewed in FIGURES 10 and 11, thereby rotating spindles 93 to tear the tail 95 away from container 91 thereby releasing the container.

*Operation of the machine*

Figure 3:
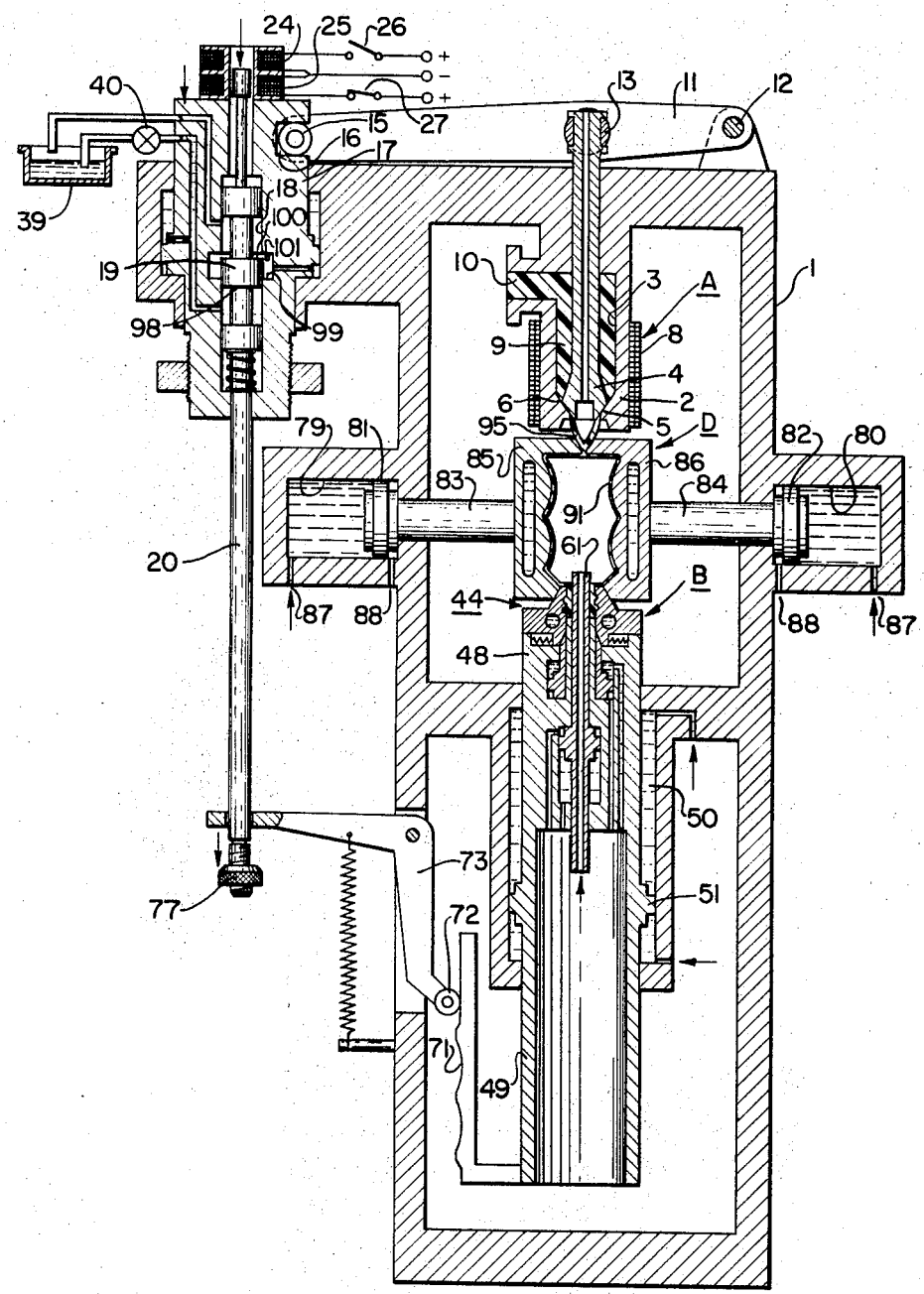
FIGURE 3 is a view similar to the preceding figures, showing the machine during the forming of the container.

Conduit 10 is fed with plastic material under pressure by a conventional plastic extruder. This plastic material, softened in the conventional manner by heat and agitation, is maintained at rest under pressure in the chamber 9. Additional heat is added by heaters 8, if desired. In the head injection stage of the operating cycle, chamber 9 is initially closed by mandrel 4 (see FIGURE 3). The truncated surface 5 abuts against the truncated surface 6 of the wall of the chamber 9. At this time switch 26 is closed (see FIGURE 1) to activate electromagnet 24 thereby lifting core 23, rods 20 and 22, valve 19 and guides 19a and 19b, to pivot lever 73 upwardly against the action of the spring 78. Immediately pressurized fluid from the pump 40 enters chamber 32 of bore 18 through conduit 37 and passes to chamber 34 due to valve 19 being in an elevated position as shown in FIGURE 1. The pressurized fluid immediately passes to cylinder 29 through conduit 35. Pressurized fluid also passes through conduit 38 to cylinder 29 above surface 31. Face 30 of piston 28, being of greater area than the area of surface 31, moves upwardly until stop nut 42 contacts portion 43 of frame 1 (position shown in FIGURE 1). During this upward displacement of the block 17, the lever 11 is pivoted at point 12 in a clockwise direction (as viewed in FIGURE 1) to lift mandrel 4 from the conical seat 6 and permit the injection of flowable plastic material from chamber 9 of the extrusion head 2 into die 44 to form the head of the container. Die 44 has been previously engaged tightly against head 2 by introducing pressurized fluid through conduit 53 into cylinder 50, thereby driving piston 51, block 48 and die 44 upwardly into the position shown in FIGURE 1. The die segments 45 and 46 are tightly locked together by engagement of their outer conical surfaces with mating conical surfaces in the bottom face of head 2 surrounding opening 7.

The head injection stage of the container forming cycle being finished, switch 26 is opened and pressurized fluid is forced through conduit 52, while conduit 53 is exhausted, to produce a downward movement of the piston 51 and block 48 to lower die 44 (see FIGURE 2).

The electromagnets 24 and 25 being deactivated at this point in the cycle, therefore, valve 19 is controlled by the action of cam follower 72 on the cam track 71. The profile surface 71a of cam track 71 determines and controls the clearance between the lower surface 98 of valve 19 and the lower surface 99 of chamber 34 of bore 18. The clearance between these surfaces regulates the flow of pressurized fluid into the lower portion of the cylinder 29 to activate piston 28, block 17 and mandrel 4 to adjust the width dimensions of passage 7.

The upward movement of block 17, subsequent to an upward movement of the slide valve 19, tends to cause the progressive closing of the passage between the edges 98 and 99, so as to re-establish the initial condition, i.e., the closed position of the passage 7. This movement toward the closed position is brought about upon closure of the passage between the edges 98, 99 due to continuous transmission of pressurized fluid to the upper part of the cylinder 29 through the conduit 38. So long as there is overlapping between the edges 98, 99 and pressurized fluid cannot pass from chamber 32 to chamber 34, no elevating movement of the block 17 and mandrel 4 takes place. As soon as the edge 100 (top surface of valve 19) and edge 101 (top surface of chamber 34) separate to provide a passage between them, fluid in the lower portion of cylinder 29 may return to reservoir 39 through conduit 37, causing a downward movement of block 17 and mandrel 4 thereby progressively closing passage 7. The lower end of cylinder 29 is being exhausted of fluid when the described condition occurs.

The control block 17 is thus adapted to regulate the flow and wall thickness of plastic material extruded through passage 7 of the head 2 to produce a parison 63 having wall thicknesses which are varied to provide the desired wall thickness in the finished container.

In the example shown, container 91 has several different wall section thicknesses over its height. These different wall thicknesses require the extrusion of a parison 63 having a thicker wall section in areas designed to form the thickest sections of the container 91. The plastic flow from passage 7 of head 2 is directly responsive to and correlated with the position of die 44 relative to passage 7 due to the downward movement of die 44 directly controlling the movement of mandrel 4 by cam track 71.

As soon as parison 63 has been completely extruded, the switch 27 is closed (either manually, by timer cam, by electrical or mechanical sensing means, etc.) to energize electromagnet 25, thereby causing a downward movement of the core 23, rods 20 and 22, and valve 19, and an overlapping of edges 98 and 99 as well as a spacing of edges 100 and 101. Thus pressurized fluid cannot pass from chamber 32 to chamber 34 but can pass from chamber 34 to chamber 33 and out conduit 37 to reservoir 39. This causes lowering of block 17 and mandrel 4, and closing of the passage 7 as surface 5 of mandrel 4 abuts conical seat 6.

Through conventional control means (not shown) pressurized fluid is then forced through conduits 87 into cylinders 79 and 80 to cause the mold shells 85 and 86 to come together enclosing the parison. Conventional control means then causes air to be blown through conduit 62 of tube 61 to inflate the parison 63 to the shape of the internal mold surfaces of the two shells 85 and 86 (see FIGURE 3).

The next stage of the operating cycle of the machine includes controlling, by conventional means, the introduction of pressurized fluid into conduits 88 of the cylinders 79 and 80 to cause a separation of shells 85 and 86 of the mold (see FIGURE 4). Subsequent to this operation, the gripping means including the support 92 are brought over and adjacent container 91 with the contanier tail 95 positioned centrally of support 92, so that fingers 94 can engage both sides of tail 95. Spindles 93 are rotated to grip tail 95 (as hereinbefore described), while simultaneously the two die segments 45 and 46 of head die 44 are separated outwardly by an upward movement of member 56 due to pressurized fluid being introduced through conduit 60 into the lower portion of the cylinder 54.

Container 91 is thus released from die 44 and held by fingers 94 of support 92 (see FIGURES 6 and 7). Tube 61 is then withdrawn downwardly out of container 91 by introducing pressurized fluid through conduit 66 into the upper end of cylinder 65 to move piston 64 downward with the depending tube 61. Support 92 is then moved transversely from under head 2 to carry container 91 to a discharging site where spindles 93 are rotated through an additional angle (as previously described) to cause fingers 94 to lift the tail 95 away from the base of the container 91 which is held firmly against surface 97.

The machine described could be completed by means also permitting the filling of the containers as by modifying the machine so that its top members are disposed at the bottom and inversely. The head of the container 91 would then be located at the top so that it could be filled. The filling operation could take place while the container, previously formed, is still hot, so that the liquid accelerates cooling of the container. Such action would increase the rate of production of the machine.

Numerous varied embodiments of this machine are possible. Thus, instead of controlling the opening and closing movements of the mandrel 4 by hydraulic means, its movements could be mechanically or electrically controlled.

The controls for coordinating the various operational functions and procedures described above are of the well-known type including mechanical and electrical mechanisms. An automatic cycle and recycle arrangement is apparent to those skilled in this art.

While I have described a present preferred embodiment of my invention, it may be modified in readily apparent ways while remaining within the spirit of my invention and within the scope of the following claims.

I claim:
1. A device for extruding a plastic parison having wall thicknesses which vary along its length comprising:
   (a) an extrusion head having surfaces defining an extrusion passage;
   (b) a mandrel having surfaces complimentary to said passage surfaces positioned in and adapted for displacement with respect to said passage;
   (c) means adapted for axial reciprocating action with respect to said extrusion head and to engage the end of the plastic parison extruded from said head to draw it away from the head in timed relation with the extrusion of plastic; and,
   (d) control means operatively connected to said reciprocating means and to said mandrel and adapted to vary the position of said mandrel in said passage in response to the position of said reciprocating means with respect to said head.

2. A device according to claim 1 wherein said reciprocating means includes separable dies in which plastic is injected to form a molded head on said parison.

3. A device according to claim 1 wherein said control means includes:
   (a) mechanically interconnected linkages operatively connected to said mandrel;
   (b) a non-planar cam surface affixed to and movable with said reciprocating means; and,
   (c) one of said linkages being mounted for engagement with said cam surface such that movement of said cam surface effects movement of said one linkage and corresponding movement of said mandrel.

4. A device according to claim 1 wherein said control means includes:
   (a) a first lever pivotally mounted at one of its ends,
      (1) said mandrel being pivotally mounted to the first lever between its ends so that pivotal movement of the lever about its said one end effects movement of the mandrel toward and away from said extrusion passage;
   (b) a second lever mounted in the proximity of the path of reciprocating action of said reciprocating means;
   (c) a non-planar cam track and a cam follower, one of said track and follower being affixed to said second lever and the other of said track and follower being affixed to said reciprocating means; said cam follower engaging said cam track so that upon rectilinear movement of one relative to the other, the one moves transversely relative to the other due to the non-planarity of the cam track; and,
   (d) connecting means operatively relating said first and second lever; movement of said reciprocating means effecting relative transverse movement between the cam track and cam follower which, in turn, effects movement of said levers and connecting means and reciprocation of said mandrel toward and away from said extrusion passage.

5. A device according to claim 4 wherein said connecting means includes:
   (a) a stationary cylinder;
   (b) a first piston mounted for reciprocation in said cylinder;
      (1) a bore through said first piston;
   (c) a second piston mounted for reciprocation in said bore,
      (1) a piston rod integral with said second piston and extending to connected relationship with said second lever such that movement of the second lever effects movement of the piston rod and second piston;
   (d) the other of the ends of said first lever being in connected relationship to said first piston such that movement of the first piston effects movement of second lever about its pivotally mounted end;
   (e) a pressurized fluid source adapted to supply said fluid through a first conduit to said bore at a location therein remote from the second piston;
   (f) an enlarged hollow portion of said bore providing a peripheral chamber having a height less than the height of said second piston;
   (g) a second conduit extending through said first piston from said peripheral chamber to said stationary cylinder at an external point on one side of the area of contact of said first piston with said stationary cylinder;

(h) a third conduit adapted to supply pressurized fluid from said pressurized fluid source to said stationary cylinder at an outer point on the other side of the area of contact of said first piston with said stationary cylinder;

(i) said second piston being movable in said bore to first and second position in response to transverse movements of said cam track and cam follower relative to each other;

(1) said first position admitting pressurized fluid through said first conduit, peripheral chamber and second conduit to said stationary cylinder at said external point on said first cylinder to effect movement of said first piston, first lever and mandrel in a direction to open said extrusion passage;

(2) said second position admitting pressurized fluid through said third conduit to said stationary cylinder at said outer point while exhausting fluid through said second conduit and bore to said pressurized fluid source, to effect movement of said first piston, first lever and mandrel in a direction to close said extrusion passage.

6. A device according to claim 5 wherein said first piston has first and second effect piston areas, these areas being opposed and said second area being greater than said first area; said third conduit supplying pressurized fluid to said first area of the first piston; and said second conduit supplying pressurized fluid to said second area of the first piston.

7. A blow molding machine for forming a finished neck plastic container comprising:

(a) an extrusion head having surfaces defining a bore;

(b) a mandrel positioned in and adapted for displacement with respect to said bore and having surfaces spaced from said head surfaces to form therewith an extrusion passage;

(c) neck mold means defining a cavity into which to injection mold a hollow neck of a container and adapted for axial reciprocating action against and away from said extrusion head whereby to receive injected plastic during formation of the head and subsequently to draw an extruded plastic parison into position for blow molding; and (d) control means operatively connected to both said reciprocating neck mold means and to said mandrel to vary the position of said mandrel in said passage in response to the position of said neck mold means with respect to the head.

8. A machine according to claim 7 wherein said control means includes:

(a) a variable surface cam track affixed to and movable with said neck mold means;

(b) follower means operatively affixed to said mandrel and positioned to ride on said cam surface to move the mandrel in response to variations in said cam surface.

9. A device according to claim 1 including:

(a) a partable mold movably mounted to enclose a portion of said parison; part of said parison extending above said mold after said enclosure of the parison;

(b) means operatively related to said mold to introduce fluid inside said parison within the mold to expand the parison into engagement with the mold to form a container with said part of the parison severably attached to the upper extremity of the container;

(c) means to open said mold while maintaining said container and parison part stationary;

(d) means movable to a position around said part of the parison and including:
(1) a supporting carriage,
(2) opposed fingers mounted on the carriage and movable toward each other into engagement with said part of the parison, and
(3) means mounted on the carriage to swing said fingers in an arcuate path toward each other to sever said part of the parison from the container.

10. A device according to claim 9 including:

(a) a pair of substantially parallel rotatable shafts mounted on said carriage, said shafts being spaced from each other to receive said part of the parison therebetween;

(b) at least one radially extending finger affixed to each shaft, and (c) power means to rotate said shafts toward and away from each other to engage said fingers against opposite sides of said part of the parison.

11. A device according to claim 10 wherein said power means includes:

(a) first means to rotate said shafts to engage said fingers against opposite sides of said part of the parison;

(b) second means to further rotate said shafts to sever said part of the parison from the container.

References Cited

UNITED STATES PATENTS

| | | | |
|---|---|---|---|
| 2,953,817 | 9/1960 | Miller et al. | 18—5 |
| 3,019,480 | 2/1962 | Soubier | 18—5 |
| 3,029,471 | 4/1962 | Adams et al. | 18—5 |
| 3,172,152 | 3/1965 | Uhlig | 18—5 |
| 3,186,032 | 6/1965 | Harwood | 18—5 |
| 3,196,592 | 7/1965 | Cheney | 18—5 |
| 3,229,007 | 1/1966 | Waechter et al. | |

FOREIGN PATENTS 918,946  2/1963  Great Britain.

J. SPENCER OVERHOLSER, *Primary Examiner.*

W. L. McBAY, *Assistant Examiner.*